US005719235A

United States Patent [19]
Zandona

[11] Patent Number: 5,719,235
[45] Date of Patent: Feb. 17, 1998

[54] CATALYST SYSTEM, USE OF THIS CATALYST SYSTEM FOR THE (CO) POLYMERIZATION OF OLEFINS, PROCESS FOR PREPARING THIS CATALYST SYSTEM AND OLEFIN (CO)POLYMERIZATION PROCESS

[75] Inventor: Nicola Zandona, Waterloo, Belgium

[73] Assignee: Solvay (Societe Anonyme), Brussels, Belgium

[21] Appl. No.: 558,485

[22] Filed: Nov. 16, 1995

Related U.S. Application Data

[62] Division of Ser. No. 162,940, Dec. 8, 1993, Pat. No. 5,496,782.

[30] Foreign Application Priority Data

Dec. 17, 1992 [BE] Belgium .................. 09201105

[51] Int. Cl.$^6$ ................................. C08F 4/643
[52] U.S. Cl. .............. 526/114; 526/119; 526/943; 526/352
[58] Field of Search ................ 526/114, 119, 526/943

[56] References Cited

U.S. PATENT DOCUMENTS

| | | |
|---|---|---|
| 3,901,863 | 8/1975 | Berger et al. . |
| 4,659,685 | 4/1987 | Coleman, III et al. ............... 502/113 |
| 5,032,562 | 7/1991 | Lo et al. . |
| 5,112,927 | 5/1992 | Hara et al. ........................ 526/124.8 |
| 5,120,696 | 6/1992 | Tsutsui et al. ..................... 502/113 |
| 5,145,818 | 9/1992 | Tsutsui et al. . |
| 5,242,876 | 9/1993 | Shamshoum et al. ............... 502/113 |
| 5,278,119 | 1/1994 | Turner et al. ...................... 502/155 |
| 5,594,079 | 1/1997 | Hara et al. ......................... 526/119 |

FOREIGN PATENT DOCUMENTS

| | | |
|---|---|---|
| 0427697 | of 1991 | European Pat. Off. . |
| 0 426 637 | 5/1991 | European Pat. Off. . |
| 0 427 697 | 5/1991 | European Pat. Off. . |
| 0 436 328 | 7/1991 | European Pat. Off. . |
| 0 436 399 | 7/1991 | European Pat. Off. . |
| 0 439 964 | 8/1991 | European Pat. Off. . |
| 0 500 944 | 9/1992 | European Pat. Off. . |
| 1 140 649 | 1/1969 | United Kingdom . |
| 1 259 962 | 1/1972 | United Kingdom . |

OTHER PUBLICATIONS

Yang, X. et al. (1991) J. Am. Chem. Soc. 113, 2623–5.

*Primary Examiner*—Mark Nagumo
*Attorney, Agent, or Firm*—Spencer & Frank

[57] ABSTRACT

Catalyst system comprising an ionic metallocene derived from a transition metal, a catalytic solid containing an element of group IVB, magnesium and a halogen, and an aluminium derivative. Process for preparing this catalyst system, according to which a mixture of a neutral metallocene and of the catalytic solid is prepared, the mixture thus obtained is placed in contact with an aluminium derivative and an ionizing agent is added to it. Process for (co) polymerization of an olefin, according to which a mixture of the neutral metallocene and of the catalytic solid is prepared, the mixture thus obtained is placed in contact with an aluminium derivative and the olefin, and the ionizing agent is added to it.

20 Claims, No Drawings

5,719,235

CATALYST SYSTEM, USE OF THIS CATALYST SYSTEM FOR THE (CO) POLYMERIZATION OF OLEFINS, PROCESS FOR PREPARING THIS CATALYST SYSTEM AND OLEFIN (CO)POLYMERIZATION PROCESS

CROSS-REFERENCE TO RELATED APPLICATION

This application is a division of application Ser. No. 162,940 filed Dec. 8, 1993, now U.S. Pat. No. 5,496,782 the entire disclosure of which is incorporated herein by reference.

FIELD OF THE INVENTION

The present invention relates to a mixed catalyst system for olefin polymerization, based on an ionic metallocene derived from a transition metal and an aluminium derivative. The invention also relates to a precursor of this catalyst system, a process for preparing such a catalyst system and to an olefin polymerization process employing this catalyst system.

TECHNOLOGY REVIEW

Patent Application EP-500,944 (MITSUI TOATSU CHEMICALS) discloses an alpha-olefin polymerization process in which use is made of a catalyst system obtained by reacting an organoaluminium compound with a halogenated neutral metallocene derived from a transition metal, and the product thus obtained is mixed with an ionizing agent such as triphenylcarbenium tetrakis (pentafluorophenyl)borate.

When ethylene is polymerized, this known process exhibits the disadvantage of giving rise to buildups in the polymerization plant. Furthermore, it does not make it possible to obtain polymers which have a wide molecular weight distribution and a high apparent specific weight.

SUMMARY OF THE INVENTION

The invention overcomes the abovementioned disadvantages by providing a catalyst system of novel constitution which reduces the risks of buildup when it is employed for olefin polymerization and which furthermore makes it possible to obtain polymers characterized by a higher apparent specific weight and to regulate accurately the molecular weight distribution of the (co)polymers obtained.

DETAILED DESCRIPTION OF THE INVENTION

To this end, the invention relates to a catalyst system comprising (a) at least one ionic metallocene derived from a transition metal, (b) at least one catalytic solid containing at least one element of group IVB of the Periodic Table, magnesium and a halogen, and (c) at least one aluminium derivative of general formula $AlX_nT_{3-n}$, in which X denotes a halogen, T denotes a hydrocarbon carbon radical which may optionally contain oxygen, and n is a number from 0 to 3.

In the catalyst system according to the invention the aluminium derivative of general formula $AlX_nT_{3-n}$ may, for example, be chosen from trialkylaluminiums and haloalkylaluminium compounds. The preferred aluminium derivatives are those in which the group T is a hydrocarbon radical chosen from optionally substituted alkyl, alkenyl, aryl and alkoxy groups containing up to 20 carbon atoms, such as tributyl-, trimethyl-, triethyl-, tripropyl-, triisopropyl-, triisobutyl-, trihexyl-, trioctyl- and tridodecylaluminium and diethylaluminium chloride. The most advantageous aluminium derivatives are triethylaluminium and triisobutylaluminium.

The expression "ionic metallocene" is intended to denote the product resulting from mixing a neutral metallocene with an ionizing agent as defined later.

Examples of ionizing agents which may be mentioned are triphenylcarbenium tetrakis(pentafluorophenyl)borate, N,N-dimethylanilinium tetrakis(pentafluorophenyl)borate and tri(n-butyl)ammonium tetrakis(pentafluorophenyl)borate.

They may also be tris(pentafluorophenyl)boron, triphenylboron, trimethylboron, tris(trimethylsilyl)borate and organoboroxines. The latter are used in the absence of a Brönsted acid. The preferred ionizing agents are triphenylcarbenium tetrakis(pentafluorophenyl)borate and tris (pentafluorophenyl)boron, the latter being employed in the absence of a Brönsted acid. Triphenylcarbenium tetrakis (pentafluorophenyl)borate is particularly suitable.

According to the invention the ionic metallocenes are advantageously derived from neutral metallocenes of formula $(C_p)_a(C_{p'})_bMX_xZ_z$, in which:

each of $C_p$ and $C_{p'}$ denotes an unsaturated hydrocarbon radical coordinated to a central atom, it being possible for the groups $C_p$ and $C_{p'}$ to be bonded by a covalent bridge M denotes the transition metal chosen from groups IIIB, IVB, VB and VIB of the Periodic Table a, b, x and z denote integers such that $(a+b+x+z)=m$, $x \geq 0$, $z \geq 0$ and a and/or $b \neq 0$ m denotes the valency of the transition metal M X denotes a halogen, and Z denotes a hydrocarbon radical which may optionally contain oxygen or a silyl radical of formula ($-R_t-Si-R'R''R'''$) where R denotes an optionally substituted alkyl, alkenyl, aryl, alkoxy or cycloalkyl group containing up to 20 carbon atoms R', R" and R'" are identical or different and each denotes a halogen or an optionally substituted alkyl, alkenyl, aryl, alkoxy or cycloalkyl group containing up to 20 carbon atoms t denotes 0 or 1.

The transition metal of the metallocene may be advantageously an element chosen from scandium, titanium, zirconium, hafnium and vanadium. Zirconium is preferred.

Each of the groups Cp and Cp' advantageously denotes a mono- or polycyclic group containing from 5 to 50 carbon atoms which are bonded by conjugated double bonds. As typical examples there may be mentioned the cyclopentadienyl, indenyl or fluorenyl radical or a substituted derivative of this radical in which at least one hydrogen atom is substituted by a hydrocarbon radical containing up to 10 carbon atoms. It may also be a radical derived from an element chosen from group VA of the Periodic Table, for example nitrogen or phosphorus.

Examples of neutral metallocenes of formula $(C_p)_a(C_{p'})_b MX_xZ_z$ which may be mentioned are unhalogenated, mono- and dihalogenated scandium metallocenes such as methyldi (cyclopentadienyl)scandium, chloro(cyclopentadienyl) ethylscandium, chlorodi(cyclopentadienyl)scandium and dichloro(indenyl)scandium, unhalogenated, mono-, di- and trihalogenated and trihalogenated titanium metallocenes such as diethyl-di(fluorenyl)titanium, dibromo (methylcyclopentadienyl)butyltitanium, chloro(indenyl) diisopropyititanium, chloromethyldi (pentamethylcyclopentadienyl)titanium, dibromodi (methylcyclopentadienyl)titanium and trichloro (cyclopentadienyl)titanium, unhalogenated, mono-, di- and trihalogenated zirconiummetallocenes such as dimethyl (fluorenylindenyl)zirconium, dichloro(fluorenyl) hexylzirconium, iodotri(cyclopentadienyl)zirconium, dibromo(cyclopentadienyl-1-indenyl)zirconium, trichloro (fluorenyl)zirconium, unhalogenated, mono-, di- and trihalogenated hafnium metallocenes, unhalogenated, mono-, di- and trihalogenated vanadium metallocenes such as chlorotri (cyclopentadienyl)vanadium, dichlorodi (ethylcyclopentadienyl)vanadium trichloro(ethylindenyl) vanadium, and unhalogenated, mono- and dihalogenated trivalent chromium metallocenes such as dichloro (cyclopentadienyl)chromium.

In the case where Z is a silyl radical of formula (—R,— Si—R'R"R"' the neutral metallocenes of formula $(C_p)_a(C_{p'})_b MX_xZ_z$ may, for example, be chosen from those containing, as silyl radical, allyldimethylchlorosilyl, allylmethyldiethoxysilyl, 5-(dicycloheptenyl)trichlorosilyl, 2-bromo-3-trimethylsilyl-1-propenyl, 3-chloropropyldimethylvinylsilyl, 2-(3-cyclohexenyl) ethyltrimethoxysilyl and diphenylvinylchlorosilyl.

The metallocenes which have a covalent bridge connecting the two groups $C_p$ and $C_{p'}$ may be chosen from those of general formula:

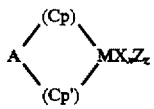

in which A denotes an alkylene group which may optionally include oxygen, alkenylene, arylalkylene, alkylarylene, arylalkenylene, optionally halogenated, or a radical derived from an element chosen from groups IIIA, IVA, VA and VIA of the Periodic Table, such as boron, aluminium, silicon, germanium, tin, nitrogen, phosphorus or sulphur. Examples of bridged metallocenes which may be mentioned are those corresponding to the formulae:

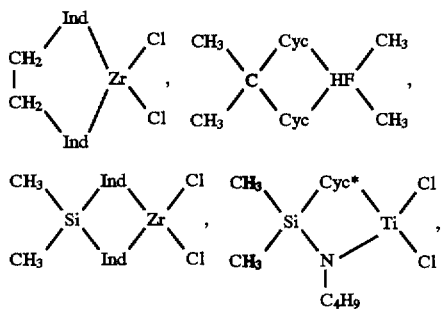

in which Ind denotes the indenyl radical, Cyc denotes the cyclopentadienyl radical and Cyc* denotes the pentamethylcyclopentadienyl radical. The preferred metallocenes of formula $(C_p)_a(C_{p'})_b MX_xZ_z$ are those in which the groups $C_p$ and $C_{p'}$ are chosen from cyclopentadienyl, indenyl and fluorenyl radicals. Good results are obtained with those in which the groups $C_p$ and $C_{p'}$ are bonded by a covalent bridge of the alkyl type. The metallocenes in which the transition metal is chosen from titanium, zirconium and hafnium are very suitable. Particularly satisfactory results are obtained with metallocenes derived from zirconium.

The catalytic solid is a catalyst of olefin polymerization, obtained by mixing a magnesium compound with a compound of an element of group IVB of the Periodic Table and a halogenated compound. The halogenated compound may optionally form an integral part of the magnesium compound or of the compound of the element of group IVB.

As magnesium compounds that can be employed for the preparation of the catalytic solid there may be mentioned, by way of examples without any limitation being implied, magnesium halides, hydroxide, oxide, hydroxyhalides, alcoholates, haloalcoholates, arylalcoholates, haloarylalcoholates and alkylhalides and mixtures thereof.

Compounds of the element of group IVB of the Periodic Table which can be employed for the synthesis of the catalytic solid are tetrahalides, alcoholates, halogenated alcoholates, trihalides obtained by the reduction of tetrahalides by means of an organoaluminium compound, or mixtures thereof. Examples which may be mentioned are $TiCl_4$, $Zr(OC_2H_5)Cl_3$, $Hf(O—C_4H_9)_2Cl_2$ and $Ti(OC_2H_5)_3Br$.

In the case where the halogen compound does not form an integral part of the magnesium compound or of the compound of the element of group IVB, it may be chosen, for example, from the halogen derivatives of alumminium of formula $AlT_yX_{3-y}$ in which T denotes a hydrocarbon radical which may optionally include oxygen, y denotes an integer from 0 to 2 and X denotes a halogen. As typical examples there may be mentioned ethylaluminium dichloride, dipropylaluminium chloride and aluminium trichloride. The halogen compound may also be selected from halogen derivatives of silicon such as, for example, $SiCl_4$, $(C_2H_5O)_2SiCl_2$ or $(CH_3)_3SiCl$.

The manufacture of the catalytic solid may also involve the use of an electron-donor such as carboxylic acids, esters, ethers and alcohols. This electron-donor is generally chosen from those containing up to 12 carbon atoms. It is advantageously employed for pretreating the magnesium compound.

A typical example of synthesis of The catalytic solid consists in mixing a halide of the element of group IVB of the Periodic Table with an oxygen compound of magnesium as described in patents GB-1,140,649 (SOLVAY & Cie) and GB-1,259,962 (SOLVAY & Cie). According to another example, a mixture of an oxygen compound of the element of group IVB and of an oxygen compound of magnesium is precipitated by means of a halogen compound, as described in patent U.S. Pat. No. 3,901,863 (SOLVAY).

The preferred catalytic solids are those in which the element of group IVB is titanium and in which the halogen is chlorine. The best results are obtained with catalytic solids which have a content of element of group IVB of 10 to 30% by weight, preferably from 15 to 20%, typically approximately 17%, a halogen content of 20 to 50% by weight, the values from 30 to 40% (in particular approximately 36%) being preferred and a magnesium. content of 0.5 to 20% by weight, usually from 1 to 10%, for example approximately 5%.

It is self-evident that the catalyst system according to the invention may include more than one ionic metallocene and more than one catalytic solid and more than one organoaluminium compound.

Catalyst systems in accordance with the invention which have produced good results are those which have a weight ratio of the transition metal to the element of group IVB of the catalytic solid of at least 0.05, preferably 0.01, for example 0.5; it is usually not greater than 10, in particular than 5, for example than 2.

According to an advantageous alternative form of the catalyst system according to the invention, this system includes an inorganic support. The inorganic support may be selected from inorganic oxides such as silicon, aluminium, titanium, zirconium and thorium oxides, their mixtures and the mixed oxides of these metals, such as aluminium silicate and aluminium phosphate, and from inorganic halides such as magnesium chloride. Silica, alumina, magnesium chloride and mixtures of silica and magnesium chloride are preferred.

Another subject of the present invention is a process for the preparation of a catalyst system suitable for olefin polymerization, which comprises at least one aluminium derivative of general formula $AlX_nT_{3-n}$, in which X denotes a halogen, T denotes a hydrocarbon radical which may optionally include oxygen and n is a number from 0 to 3, at least one ionizing agent and at least one neutral metallocene derived from a transition metal, in which, in a first stage, a mixture is prepared of the neutral metallocene with a catalytic solid containing at least one element of group IVB of the Periodic Table, of magnesium and a halogen, and, in a second stage, an aluminium derivative in at least one hydrocarbon diluent and an ionizing agent are added to the mixture thus obtained.

In the process for preparing a catalyst system according to the invention the neutral metallocene, the catalytic solid and the aluminium derivative are in accordance with those described above.

In the process for preparing a catalyst system according to the invention an ionizing agent is intended to denote a compound comprising a first part which exhibits the properties of a Lewis acid and which is capable of ionizing the neutral metallocene, and a second part which is inert towards the ionized metallocene and which is capable of stabilizing the ionized metallocene. The ionizing agent may be an ionic compound containing a cation exhibiting the properties of a Lewis acid and an anion constituting the abovementioned second part of the ionizing agent. Anions which have produced very good results are organoborates. An organoborate is intended to denote a boron derivative in which the boron atom is bonded to four organic subsituents. Examples of ionic ionizing agents which may be mentioned are triphenylcarbenium tetrakis(pentafluorophenyl)borate, N,N-di-methylanilinium tetrakis(pentafluorophenyl)borate and tri(n-butyl)ammonium tetrakis(pentafluorophenyl)borate. Preferred cationic Lewis acids are carbenium, sulphonium and oxonium.

As an alternative, the ionizing agent may also be a nonionic compound exhibiting the properties of a Lewis acid, which is capable of converting the neutral metallocene into cationic metallocene. To this end, the ionizing agent itself is converted into an anion which is inert towards the cationic metallocene, which is capable of stabilizing the latter. Examples of nonionic ionizing agent which may be mentioned are tris(pentafluorophenyl)boron, triphenylboron, trimethylboron, tris(trimethylsilyl)borate and organoboroxines. The nonionic ionizing agents are used in the absence of a Brönsted acid.

The ionizing agent is preferably selected from triphenylcarbenium tetrakis(pentafluorophenyl)borate and tris(pentafluorophenyl)boron.

The first stage of the process for preparing a catalyst system according to the invention consists in mixing the neutral metallocene with the catalytic solid. This mixing may be performed by a dry route by mixing the constituents in the solid state. It may also be carried out by impregnating the catalytic solid with a solution of the neutral metallocene in a hydrocarbon diluent. The suspension thus obtained can be employed as it is in the following stage. As an alternative, the catalytic solid impregnated with the neutral metallocene may be collected from the suspension and used in the following stage in the solid state.

This first stage may be performed at any temperature which is lower than the decomposition temperature of the neutral metallocene and of the catalytic solid. The temperature is usually between ambient temperature and 100° C., preferably from 50° to 85° C.

In this first stage the neutral metallocene and the catalytic solid are advantageously used in quantities such that the weight ratio of the neutral metallocene to the catalytic solid is generally at least 0.01, in particular at least 0.1; it is usually not greater than 20, preferably than 10, values from 0.3 to 5, typically approximately 2, being the most advantageous ones.

The mixture prepared during the first stage of the process for preparing a catalyst system according to the invention may include more than one neutral metallocene and more than one catalytic solid.

The second stage of the process for preparing a catalyst system in accordance with the invention consists in placing the mixture obtained in the first stage in contact with the aluminium derivative in at least one hydrocarbon diluent and with the ionizing agent. The function of the aluminium derivative is to serve as cocatalyst for the catalyst system during its use for the olefin polymerization. In the case where the neutral metallocene used in the first stage is halogenated, the aluminium derivative includes at least one hydrocarbon radical. In this case the function of the aluminium derivative is also to substitute, in the second stage of the process according to the invention, an least one of the halogens in the neutral metallocene with a hydrocarbon radical. In this case it is desirable to add first the aluminium derivative and then the ionizing agent to the mixture originating from the first stage. In the case where the neutral metallocene used in the first stage is unhalogenated, it may prove to be advantageous to add the aluminium derivative at the time of use of the catalyst system in an olefin polymerization process.

The hydrocarbon diluent which can be employed in this second stage may be chosen from aliphatic hydrocarbon such as linear alkanes (for example n-butane, n-hexane and n-heptane), branched alkanes (for example isobutane, isopentane, isooctane and 2,2-dimethylpropane), cycloalkanes (for example cyclopentane and cyclohexane), from monocyclic aromatic hydrocarbons such as benzene and its derivatives, for example toluene, and from polycyclic aromatic hydrocarbons, it being possible for each ring to be substituted. It is obviously possible to employ a number of hydrocarbon diluents simultaneously. Toluene is suitable.

The quantity of the aluminium derivative used in the second stage, in relation to that of the neutral metallocene, depends on the choice of these compounds. In practice, in the case where the neutral metallocene is halogenated, it is advantageous to employ the aluminium derivative in a quantity which is sufficient to substitute all of the halogen atoms in the neutral mentallocene. It may be advantageous to employ larger quantities of the aluminium derivative to have the benefit of its properties as impurity-scavenger during the manufacture of the catalyst system. To this end, it is recommended, for example, that the molar ratio of the aluminium derivative to the neutral metallocene should be at least 10. In order also to have the benefit of the abovementioned properties of the aluminium derivative during the use of the catalyst system in an olefin polymerization process, in which the aluminium derivative also acts as cocatalyst of the catalytic solid, it is recommended that the molar ratio of the aluminium derivative to the neutral metallocene should be at least 100. In principle, there is no upper limit to the above-mentioned molar ratio. In practice, however, there is no advantage in this ratio exceeding B5000, for economic reasons, values lower than 2000 being recommended. Values close to 500 to 1000 are generally suitable.

In this second stage of the process for preparing a catalyst system according to the invention the ionizing agent is preferably used in a quantity which is sufficient to ionize all of the metallocene. The quantity of ionizing agent to be used will consequently depend on the neutral metallocene and the ionizing agent which are selected. In general it is possible to employ a quantity of ionizing agent such that the molar ratio of the ionizing agent to the neutral metallocene used in the abovementioned first stage is at least 0.1, in particular at least 0.5, values not exceeding 10 being preferred, those not exceeding 2 being recommended.

This second stage of the process for preparing a catalyst system according to the invention may be performed at any temperature which is at the same time lower than the boiling temperature of the most volatile compound in the medium obtained at the working pressure, and lower than the thermal decomposition temperature of the components of the mixture. A medium is intended to denote all of the components used in the second stage (neutral metallocene, catalytic solid, aluminium derivative, hydrocarbon diluent and ionizing agent) and which are collected at the end thereof. The temperature consequently depends on the nature of the components of the medium and is generally higher than $-50°$ C., preferably at least $0°$ C. It usually does not exceed $100°$ C. and is preferably lower than $80°$ C. Ambient temperature is particularly suitable.

The duration of this second stage must be sufficient to obtain a complete ionization of the metallocene or of the product of its reaction with the aluminium derivative. It may vary from a few seconds to several hours. Since the reactions in the second stage are generally virtually instantaneous, periods of 0.5 to 30 minutes are the most common ones. The medium may be stirred throughout the duration of the second stage or for a part thereof.

More than one aluminium derivative and more than one ionizing agent may be used in the second stage of the process for preparing a catalyst system according to the invention. At the end of the second stage the catalyst system may be isolated in the solid state from the suspension.

In a first embodiment of the process for preparing a catalyst system according to the invention the first stage is carried out by a dry route by mixing the catalytic solid and the neutral metallocene in the solid state and the solid mixture thus obtained is used in the second stage.

In an alternative form of this first embodiment the neutral metallocene and the catalytic solid are milled together in the solid state while being mixed.

In a second embodiment of the process for preparing a catalyst system according to the invention the catalytic solid is impregnated with a solution of the neutral metallocene. To this end it is dissolved beforehand in an aromatic hydrocarbon, preferably toluene. In this embodiment the impregnated catalytic solid is collected from the suspension and used in the solid state in the following stage.

In a third embodiment of the process for preparing a catalyst system in accordance with the invention a solid resulting from placing The aluminium derivative in contact with the mixture originating from the first stage is collected and the ionizing agent is then added to this solid.

In the process for preparing a catalyst system according to the invention the ionizing agent may be used in the solid state or in the liquid state, for example in the form of a solution.

In a fourth embodiment of the process for preparing a catalyst system according to the invention, where the ionizing agent is used in the form of a solution, The second stage of the process is preceded by dissolving The ionizing agent in a hydrocarbon diluent. The hydrocarbon diluent may be selected from aromatic hydrocarbons such as toluene, and halogenated aliphatic hydrocarbons such as methylene chloride and chloroform. Toluene is suitable. In this embodiment the quantity of the hydrocarbon diluent used must be sufficient to permit the ionizing agent to dissolve completely therein. The quantity of the hydrocarbon diluent consequently depends on its nature, the nature of the ionizing agent and the temperature at which the second stage of the process is performed.

In a fifth embodiment of the process for preparing a catalyst system according to the invention the neutral metallocene is deposited on an inorganic support. The inorganic support may be selected from inorganic oxides such as silicon, aluminium, titanium, zirconium and thorium oxides, their mixtures and mixed oxides of these metals, such as aluminium silicate and aluminium phosphate, and from metal halides such as magnesium chloride. Silica, alumina, magnesium chloride and mixtures of silica and magnesium chloride are preferred.

In a first alternative form of this fifth embodiment the inorganic support, optionally preactivated by any known means, is impregnated with a solution of the neutral metallocene. The solution may be prepared as in the second embodiment of the process according to the invention, detailed above. The operating temperature for the impregnation may vary from ambient temperature to the boiling temperature of the solution of the neutral metallocene, and the duration of the impregnation may vary from a few minutes to several hours. In this embodiment the inorganic support impregnated with the neutral metallocene is collected from the suspension, and then mixed with the catalytic solid during the first stage detailed above.

In a second alternative form of this fifth embodiment the inorganic support and the neutral metallocene are mixed in the solid state (optionally by being milled together). The solid mixture thus obtained is then used in the first stage detailed above.

In a sixth embodiment of the process for preparing a catalyst system according to the invention the ionizing agent is deposited on an inorganic support. To this end the inorganic support, optionally preactivated by any known means, is impregnated with a solution of the ionizing agent. The solution may be prepared as in the fourth embodiment of the process according to the invention detailed above. The inorganic support and the operating conditions for the impregnation are in accordance with what has been described above in the fifth embodiment of the process according to the invention.

In a seventh embodiment of the process for preparing a catalyst system according to the invention, which is particularly efficacious, the catalytic solid is mixed in the dry state with an inorganic support and the mixture thus obtained is used in the first stage of the process according to the invention. The inorganic support is in accordance with that employed in the fifth embodiment of the process detailed above.

In an eighth embodiment of the process for preparing a catalyst system according to the invention a neutral metallocene of formula $(C_p)_a(C_{p'})_bMX_x(-R_r-Si-R'R''R''')_z$ is used, which has been prepared by reacting with a silane a compound of formula $(C_p)_a(C_{p'})_bMX_xH_z$, where the symbols $C_p$, $C_{p'}$, M, X, H, a, b, x and z have the same meaning as that given above, with the exception of z, which is greater than zero. The reaction is preferably done in a suitable solvent.

Compounds of formula $(C_p)_a(C_{p'})_bMX_xH_z$ which have produced very good results are especially those derived from zirconium, titanium and hafnium, in which $C_p$ and $C_{p'}$ are chosen from cyclopentadienyl, indenyl and fluorenyl radicals. Those derived from zirconium are preferably employed. X preferably denotes chlorine. Examples of silanes that can be employed in this embodiment and which may be mentioned are allyldimethylchlorosilane, allylmethyldiethoxysilane, 5-(dicycloheptenyl) trichlorosilane, 2-bromo-3-trimethylsilyl-1-propene, 3-chloropropyldiylsilane, 2-(3-cyclohexenyl) ethyltrimethoxysilane, diphenylvinylchlorosilane, vinyltriphenoxysilane, vinyltrichlorosilane, 2-(trimethylsilylmethyl)-1,3-butadiene and 3-(trimethylsilyl)cyclopentene. The preferred silanes are unchlorinated alkenylsilanes such as allyltriethoxysilane, allyltrimethylsilane, 5-(bicycloheptenyl)triethoxysilane, vinyl(trimethoxy)silane and 2-(3-cyclohexenyl) ethyltrimethoxysilane. Vinyl(trimethoxy)silane is particularly suitable. The solvent for the reaction between silane and the compound of formula $(C_p)_a(C_{p'})_bMX_xH_z$ is advantageously an aromatic hydrocarbon, preferably toluene. The temperature at which this reaction is performed may vary from ambient temperature up to the boiling temperature of the solvent employed, for example from 20° to 100° C. The preferred temperature is the ambient temperature.

In a ninth embodiment of the process for preparing a catalyst system according to the invention, use is made of a neutral metallocene of formula $(C_p)_a(C_{p'})_bMX_xZ_z$, where the symbols $C_p$, $C_{p'}$, M, X, Z, a, b, x and z have the same meaning as that given above, in which z is other than 0 and Z is a hydrocarbon radical which has been prepared by reacting a compound of formula $(C_p)a(C_{p'})_bMX_xH_z$ with an olefin. This reaction preferably takes place in a suitable solvent. The compounds of formula $(C_p)_a(C_{p'})_bMX_xH_z$ are in accordance with those defined above in the eighth embodiment. The olefins which can be employed in this embodiment advantageously contain up to 20 carbon atoms, preferably up to 12 carbon atoms, and may be chosen from monoolefins such as ethylene and 3-ethyl-1-butene, unconjugated diolefins such as 1,5-hexadiene, conjugated diolefins such as 1,3-pentadiene and alicyclic diolefins such as dicyclopentadienyl. The preferred olefin is ethylene. The solvent for the reaction between the olefin and the compound of formula $(C_p)_a(C_{p'})_bMX_xH_z$ is advantageously an aromatic hydrocarbon, preferably toluene. The temperature at which this reaction is performed may vary from the ambient temperature up to the boiling temperature of the solvent employed, for example from 20° to 100° C. The preferred temperature is the ambient temperature.

These two last embodiments of the process according to the invention make it possible to manufacture catalyst systems by starting from metallocene hydrides of formula $(C_p)_a(C_{p'})_bMX_xH_z$ in which z is other than 0, which are generally difficult to manipulate because of their polymeric nature and of the difficulty of being economically solubilized.

The process for preparing a catalyst system according to the invention makes it possible to obtain mixed catalyst systems based on an ionic metallocene and a catalytic solid containing at least one element of group IVB of the Periodic Table, magnesium and a halogen.

Another subject of the present invention is a precursor of a catalyst system comprising (a) at least one neutral metallocene derived from a transition metal, (b) at least one catalytic solid containing at least one element of group IVB of the Periodic Table, magnesium and a halogen, and (c) at least one aluminium derivative of general formula $AlX_nT_{3-n}$ in which X denotes a halogen, T denotes a hydrocarbon radical which may optionally include oxygen, and n is a number from 0 to 3.

The catalyst system according to the invention may be employed for the homopolymerization and copolymerization of olefins containing up to 20 carbon atoms per molecule. The olefins advantageously contain from 2 to 12 carbon atoms per molecule and are, for example, chosen from ethylene, propylene, 1-butene, 1-pentene, 3-methyl-1-butene, 1-hexene, 3- and 4-methyl-1-pentene, 1-octene, 3-ethyl-1-butene, 1-heptene, 3,4-dimethyl-1-hexene, 4-butyl-1-octene, 5-ethyl-1-decene and 3,3-dimethyl-1-butene, and vinyl monomers such as styrene. The catalyst systems according to the invention find a particular use in the production of homopolymers of ethylene and propylene or of copolymers of ethylene and propylene with one or a number of olefinically unsaturated comonomers. The comonomers may be various substances. They can be monoolefins which may contain up to 8 carbon atoms, for example 1-butene, 1-pentene, 3-methyl-1-butene, 1-hexene, 3- and 4-methyl-1-pentenes and 1-octene. One or more diolefins containing from 4 to 18 carbon atoms may also be copolymerized with ethylene and propylene. The diolefins are preferably chosen from unconjugated aliphatic diolefins such as 4-vinyl cyclohexene 3,5-hexadiene, alicyclic diolefins containing an endocyclic bridge, such as dicyclopentadiene, methylene-and ethylidene norbornene and conjugated aliphatic diolefins such as 1,3-butadiene, isoprene and 1,3-pentadiene.

The catalyst system according to the invention appears particularly efficacious for the manufacture of homopolymers of ethylene or propylene and of copolymers of ethylene or propylene containing at least 90%, preferably at least 95%, by weight of ethylene or propylene. The preferred comonomers for ethylene are propylene, 1-butene, 1-hexene, 1-octene and 1,5-hexadiene, and those for propylene are ethylene, 1,3-butadiene and 1,5-hexadiene.

The invention consequently also relates to the use of the catalyst system according to the invention for the (co) polymerization of olefins.

The invention also relates to a process for (co) polymerization of at least one olefin in the presence of a catalyst system comprising at least one aluminium derivative of general formula $AlX_nT_{3-n}$, in which X denotes a halogen, T denotes a hydrocarbon radical which may optionally include oxygen, and n is a number from 0 to 3, at least one ionizing agent and at least one neutral metallocene derived from a transition metal, in which a mixture is prepared of the neutral metallocene with a catalytic solid containing at least one element of group IVB of the Periodic Table, magnesium and a halogen, the mixture thus obtained is placed in contact with at least one hydrocarbon diluent, the aluminium derivative and the olefin, and the ionizing agent is added thereto.

In the process for (co)polymerization according to the invention the aluminium derivative, the neutral metallocene, the ionizing agent, the catalytic solid and the hydrocarbon diluent are in accordance with those employed in the process according to the invention for preparing the catalyst system detailed above. Isobutane or hexane is preferably employed as hydrocarbon diluent. Isobutane is particularly suitable.

In the process for (co)polymerization according to the invention the olefin is in accordance with the definition provided above, of the olefins which are polymerizable in the presence of the catalyst systems according to the invention.

In the process for (co)polymerization according to the invention the preparation of the mixture of the neutral metallocene and of the catalytic solid, and the addition of the ionizing agent are carried out respectively as in the first and the second stage of the process for preparing the catalyst system described above, preferably in the polymerization reactor.

In the process for (co)polymerization according to the invention, from the time when the olefin is added to the polymerization reactor, polymer chains are formed in the presence of the catalytic solid, activated by the aluminium derivative acting as cocatalyst. This formation of polymer chains continues until the activity of the catalytic solid and/or the olefin supply is exhausted. Furthermore, as soon as the ionizing agent is added to the polymerization reactor, another type of polymer chain is formed, catalysed by the ionic metallocene (activated by the aluminium derivative and by the ionizing agent). Thus, the final polymeric product consists of at least two types of polymer chains in proportions that can be varied according to the quantities of the catalytic solid, of the neutral metallocene and of the ionizing agent which are used and according to the time of introduction of the ionizing agent.

In a first embodiment of the process for (co) polymerization according to the invention the mixture of the neutral metallocene and of the catalytic solid is first of all placed in contact with the aluminium derivative in the polymerization reactor and the olefin is then introduced into it. To this end the placing in contact with the organoaluminium compound may be carried out as in the second stage of the process according to the invention for preparing the catalyst system described above.

In a second embodiment the aluminium derivative and the olefin are placed in contact with the mixture of the neutral metallocene and of the catalytic solid simultaneously while they are introduced at the same time into the polymerization reactor, and the ionizing agent is then added thereto.

In an alternative form of this second embodiment, which is particularly preferred, a mixture of a solution of the aluminium derivative in the hydrocarbon diluent and of the olefin is prepared beforehand, to which the mixture of the neutral metallocene and of the catalytic solid is added, and then the ionizing agent.

In a third embodiment of the (co)polymerization process according to the invention the ionizing agent and the olefin are introduced simultaneously into the polymerization reactor.

In an alternative form of this third embodiment a mixture including the olefin, the ionizing agent and the aluminium derivative is prepared beforehand, to which the mixture of the neutral metallocene and of the catalytic solid is added.

In a fourth embodiment the ionizing agent is introduced into the polymerization reactor after the activity of the catalytic solid has been reduced by at least 50%, preferably at least 75% of its initial value. Activity of the catalytic solid is intended to denote the quantitiy of polymer obtained, expressed in grams, in the presence of the catalytic solid, per hour and per gram of catalytic solid.

In an alternative form of this fourth embodiment of the process for (co)polymerization in accordance with the invention the neutral metallocene and the catalytic solid are used in quantities such that the weight ratio of the neutral metallocene to the catalytic solid is from 1 to 20. This alternative form of the invention proves to be particularly advantageous when it is desired to limit the phenomena of buildup in the polymerization reactor and to promote the formation of (co)polymers of high apparent specific weight. In fact, because of the small quantity of catalytic solid in relation to that of the metallocene, this alternative form makes it possible, after the introduction of the olefin and before the addition of the ionizing agent, to coat the catalytic sites of the metallocene, which will be activated only when the ionizing agent is added, thus resulting in the advantages referred to above.

In a fifth embodiment of the process for (co) polymerization in accordance with the invention the neutral metallocene and the catalytic solid are used in quantities such that the molar ratio of the neutral metallocene to the catalytic solid is from 0.01 to 1. This embodiment appears to be particularly efficacious when it is desired to obtain (co)polymers which have a wide molecular weight distribution, while limiting their oligomer content.

In a sixth embodiment of the process for (co) polymerization in accordance with the invention the neutral metallocene or the ionizing agent is deposited on an inorganic support. The inorganic support is in accordance with that employed in the fifth embodiment of the process according to the invention for preparing the catalyst system.

In a first alternative form of this sixth embodiment of the process for (co)polymerization according to the invention the inorganic support is impregnated with a solution of the neutral metallocene (or of the ionizing agent) as described in the second (or the fourth) embodiment of the process according to the invention for preparing the catalyst system.

In a second alternative form of this sixth embodiment of the process for (co)polymerization according to the invention the inorganic support and the neutral metallocene (or the ionizing agent) are mixed (optionally by being milled together) in the solid state.

In a particularly advantageous alternative form of this sixth embodiment of the process for (co)polymerization in accordance with the invention the catalytic solid is mixed with an inorganic support before this mixture is placed in contact with the neutral metallocene. The inorganic support is in accordance with that employed as support for the neutral metallocene described above.

In the process for (co)polymerization in accordance with the invention the polymerization may be performed equally well in solution, in suspension or in gaseous phase and may be carried out continuously or noncontinuously, for example by performing the polymerization in one or more reactors. It is thus possible to work advantageously in a single reactor. Another procedure consists in working in a number of reactors arranged in series, the catalytic solid being activated in the first reactor and the metallocene in a following reactor. The process thus carried out proves to be particularly efficacious for the manufacture of (co)polymers which have a multimodal, in particular bimodal, molecular weight distribution. A molecular weight regulator, such as hydrogen, may optionally be used in the (co)polymerization. An alternative form of the process for (co)polymerization according to the invention comprises a prepolymerization in suspension in a first reactor, followed by a gas phase polymerization in a second reactor.

In the case of a suspension (co)polymerization the latter is performed in a hydrocarbon diluent such as those which can be employed in the preparation of the mixture of the neutral metallocene and of the aluminium derivative, and at a temperature such that at least 50% (preferably at least 70%) of the (co)polymer formed therein is insoluble. The temperature is generally at least 20° C., preferably at least 50° C. it is usually not higher than 200° C., preferably not higher than 100° C. The partial pressure of olefin is in most cases at least equal to atmospheric pressure, preferably ≧0.4 MPa, for example ≧0.6 MPa; this pressure is generally not greater than 5 MPa, preferably ≦2 MPa, for example ≦1.5 MPa.

In the case of a solution (co)polymerization, the latter may be carried out in a hydrocarbon diluent such as those mentioned above. The operating temperature depends on the hydrocarbon diluent employed and must be higher than the temperature for dissolving the (co)polymer in the latter, with the result that at least 50% (preferably at least 70%) of the (co)polymer is dissolved therein. Furthermore, the temperature must be sufficiently low to prevent a thermal degradation of the (co)polymer and/or of the catalyst system. The optimum temperature is in general from 100° to 200° C. The partial pressure of olefin is in most cases at least equal to atmospheric pressure, preferably ≧0.4 MPa, for example ≧0.6 MPa; this pressure is in general not greater than 5 MPa, preferably ≦2 MPa, for example ≦1.5 MPa. In an alternative form, the (co)polymerization is performed by employing the olefin itself as hydrocarbon diluent. In this alternative form it is possible to employ an olefin which is liquid under normal pressure and temperature conditions, or to operate at a sufficient pressure for a normally gaseous olefin to be liquefied.

In the case where the (co)polymerization is performed in the gas phase, a gas stream including the olefin is brought into contact with the catalyst system in a fluidized bed. Consequently the flow rate of the gas stream must be sufficient to keep the (co)polymer fluidized and depends on the rate of formation of the latter and on the rate at which the catalyst system is consumed. The partial pressure of the olefin may be lower than or higher than atmospheric pressure, the preferred partial pressure varying from atmospheric pressure to approximately 7 MPa. In general, a pressure of from 0.2 to 5 MPa is suitable. The choice of the temperature is not critical; the latter is in general from 30° to 200° C. A diluent gas which must be inert towards the (co)polymer may optionally be employed.

A particular embodiment of the process for (co) polymerization according to the invention consists in copolymerizing at least two olefins introduced simultaneously or with a delay into the polymerization reactor, the two olefins being preferably introduced before the addition of the ionizing agent.

The process for (co)polymerization according to the invention is particularly efficacious for the manufacture of homopolymers of ethylene or propylene and of (co) polymers of ethylene and/or of propylene.

The process for (co)polymerization in accordance with the invention reduces the risks of buildup in the polymerization reactor and makes it possible to obtain (co)polymers exhibiting at least one of the following advantageous properties:

a low content of metal impurities originating from the catalyst system, a broad molecular weight distribution, a high apparent specific weight.

The process for (co)polymerization according to the invention makes it possible, in particular, to produce (co) polymers exhibiting the following properties: a molecular weight distribution which has an $M_w/M_n$ ratio of at least 10, in general of at least 20, more particularly of at least 30, $M_w$ and $M_n$ denoting, respectively, the weight-average molecular mass and the number-average molecular mass of the (co)polymer produced, an apparent specific weight of at least 100 $g/dm^3$, typically of at least 120.

The examples, the description of which follows, serve to illustrate the invention. Examples 1 to 3 are in accordance with the invention. Examples 4 and 5 are comparative examples.

The meaning of the symbols employed in these examples, the units expressing the quantities mentioned and the methods for measuring these quantities are detailed below.

$M_w/M_n$=ratio of the weight-average molecular mass to the number-average molecular mass, measured by steric exclusion chromatography carried out in 1,2,4-trichlorobenzene at 135° C. on a Waters model 150 C. chromatograph.

ASW=apparent specific weight of the (co)polymer, expressed in $g/dm^3$ and measured using free flow according to the following operating procedure: the powder to be analysed is poured, its packing being avoided, into a cylindrical receptacle 50 $cm^3$ in capacity, from a hopper whose lower edge is arranged 20 mm above the upper edge of the receptacle. The powder-filled receptacle is then weighed, the tare is subtracted from the observed weight and. the result obtained (expressed in g) is multiplied by 20.

In Examples 1 and 2, in accordance with the invention, polyethylene was manufactured by a suspension process by means of an unsupported mixed catalyst system, in which the metallocene and the catalytic solid are activated simultaneously.

EXAMPLE 1

(in accordance with the invention):

(a) preparation of the catalytic solid

Magnesium diethylate was reacted with titanium tetrabutylate in quantities such that the molar ratio of magnesium to titanium is 2. The reaction product thus obtained was then chlorinated and precipitated by placing the latter in contact with a solution of ethylaluminium dichloride. The solid thus obtained, collected from the suspension, contained (% by weight):

Ti: 17.0

Cl: 36.2

Al: 1.9

Mg: 4.5

(b) mixing of the neutral metallocene and of the catalytic solid 637 mg of a bis(cyclopentadienyl)dichlorozirconium powder were mixed with stirring for 48 hours in 20 ml of hexane with 1396 mg of the catalytic solid obtained in (a). The solid collected contained (% by weight):

Ti: 11.0

Zr: 9.5

Cl: 26.2

Al: 1.3

Mg: 2.9

(c) ethylene polymerization 1 ml of a solution containing 40 g/l of triethylaluminium and 1 l of isobutane were introduced into a reactor of three liter capacity, fitted with a stirrer. The reactor was then fed with ethylene at a partial pressure of 0.8 MPa and with hydrogen at a partial pressure of 0.04 MPa. The temperature was brought to 60° C. 0.0043 g of the solid obtained in (b) and 0.0022 mmol of treiphenylcarbenium textrakis (pentafluorophenyl)borate were then added in the form of solution in toluene. The ethylene pressure and the temperature were kept constant during the polymerization period. After 90 minutes the reactor was cooled and degassed. 55 g of polyethylene were collected. The polymer obtained had the following characteristics:

$M_w/M_n=31$
ASW=193

EXAMPLE 2

(in accordance with the invention):
(a) preparation of the catalytic solid

The same catalytic solid as that obtained in Example 1(a) was employed.

(b) mixing of the neutral metallocene and of the catalytic solid 1197 mg of bis(cyclopentadienyl)dichlorozirconium were mixed with stirring for 48 hours in 20 ml of hexane with 1396 mg of the catalytic solid obtained in (a). The solid thus obtained contained (% by weight):

Ti: 8.6
Zr: 14.0
Cl: 26.9
Al: 1.0
Mg: 2.3

(c) ethylene polymerization 1 ml of a solution containing 40 g/l of triethylaluminium and 1 l of isobutane were introduced into a three-liter reactor fitted with a stirrer. The reactor was then fed with ethylene at a partial pressure of 0.8 MPa and with hydrogen at a partial pressure of 0.04 MPa. The temperature was brought to 60° C. 0.0041 g of the solid obtained in (b) and 0.0022 mmol of triphenylcarbenium tetrakis(pentafluorophenyl) borate in the form of solution in toluene were then added. The ethylene pressure and the temperature were kept constant during the polymerization period. After 90 minutes the reactor was cooled and degassed. 37 g of polyethylene were collected. The polymer obtained had the following characteristics :

$M_w/M_n=41$

EXAMPLE 3

(in accordance with the invention):

A supported catalyst system was used in this example and the polymerization was performed in two consecutive stages.

(a) preparation of the catalytic solid:

The same catalytic solid as That obtained in Example 1(a) was employed.

(b) preparation and activation of the support:

MS3040 type silica from the PQ company was calcined at 600° C. for 16 hours under dry air and was then mixed with a quantity of magnesium chloride such as to make the mixture contain 9.8% by weight of magnesium. Mixing was performed in a rotary kiln at 400° C. for 16 hours under nitrogen.

(c) mixing of the neutral metallocene and of the catalytic solid 3.9 g of the support obtained in (b) were mixed with 0.222 g of the catalytic solid obtained in (a) and 0.430 g of a bis(cyclopentadienyl)dichlorozirconium powder for 28 hours at 50° C.

(d) ethylene polymerization:

1 ml of a solution containing 40 g/l of triethylaluminium and 1 l of isobutane were introduced into a three-liter reactor fitted with a stirrer. The temperature was brought to 70° C. The reactor was then fed with ethylene at a partial pressure of 0.6 MPa. 89.9 g of the solid obtained in (c) were then added to it. The ethylene pressure and the temperature were kept constant during the polymerization period. After 10 minutes the reactor was cooled and degassed. 1 l of isobutane was then reintroduced into the reactor. The temperature was raised to 50° C. and the reactor was again fed with ethylene at a partial pressure of 1 MPa. 0.0022 mmol of triphenylcarbenium tetrakis(pentafluorophenyl)borate was then added. After 30 minutes the reactor was degassed and cooled. No trace of buildup was found in the polymerization reactor. 168 g of polyethylene were collected. The polymer obtained had the following characteristics:

ASW=134.

EXAMPLE 4

(given by way of comparison):

In this example not in accordance with the invention polyethylene was manufactured by means of a supported metallocene according to the process described in Patent Application EP-500,944.

(a) preparation and activation of the support:

The same support as that obtained in Example 3(b) was employed.

(b) mixing of the neutral metallocene with the support: 3.8 g of the support obtained in (a) were mixed with 0.354 g of a bis(cyclopentadienyl)dichlorozirconium powder for 9 hours at 50° C.

(c) ethylene polymerization:

1 ml of a solution containing 40 g/l of triethylaluminium and 1 l of isobutane were introduced into a three-liter reactor fitted with a stirrer. The temperature was brought to 50° C. The reactor was then fed with ethylene at a partial pressure of 1 MPa. 90 mg of the solid obtained in (b) and 0.0022 mmol of triphenylcarbenium tetrakis(pentafluorophenyl) borate were then added to it. The ethylene pressure and the temperature were kept constant during the polymerization period. After 23 minutes the reactor was cooled and degassed. It was found that the wall of the reactor was covered with a fine layer of buildup product. 113 g of polyethylene were collected. The polymer obtained had the following characteristics:

ASW=42.6.

A comparison of the results of Example 4 with those of Example 3 reveals the progress brought about by the invention insofar as the apparent specific weight of the polymer and the buildup phenomena in the polymerization reactor are concerned.

EXAMPLE 5

(given by way of comparison):

In this example not in accordance with the invention polyethylene was manufactured by means of a supported metallocene according to the process described in Patent Application EP-500,944.

(a) preparation and activation of the support:

948 type silica from the Grace company was calcined at 800° C. for 16 hours under nitrogen purging.

(b) mixing of the neutral metallocene with the support:

2 g of the support obtained in (a) were treated with a solution of 232 mg of bis(cyclopentadienyl) dichlorozirconium in 20 ml of toluene. The toluene was then removed by distillation at reduced pressure. The solid thus obtained was suspended in 48 ml of hexane.

(c) ethylene polymerization 1 ml of a solution containing 40 g/l of triethylaluminium and 1 l of isobutane were introduced into a three-liter reactor fitted with a stirrer. The temperature was brought to 60° C. The reactor was then fed with ethylene at a partial pressure of 0.8 MPa. A quantity of the suspension obtained in (b) containing 92 mg of solid and 0.0022 mmol of triphenylcarbenium tetrakis(pentafluorophenyl)borate were then added to it. The ethylene pressure and the temperature were kept constant during the polymerization period. After 90 minutes the reactor was cooled and degassed. It was found that the wall of the reactor was covered with a fine layer of buildup product. 56 g of polyethylene were collected. The polymer obtained had the following characteristic:

$M_w/M_n=7.9$

A comparison of the results of Examples 1 and 2 with those of Example 5 reveals the progress brought about by the invention insofar as the molecular weight distribution of the polymer obtained is concerned.

What is claimed is:

1. A process for (co)polymerization of at least one olefin in the presence of a catalyst system comprising at least one aluminum derivative of general formula $AlX_nT_{3-n}$ in which X denotes a halogen, T denotes a hydrocarbon radical which may optionally include oxygen and n is a number from 0 to 3, at least one ionizing agent selected from the group consisting of ionic compounds containing a cation exhibiting the properties of a Lewis acid and an anion which is inert towards ionized metallocene and capable of stabilizing ionized metallocene, and nonionic compounds selected from the group consisting of tris(pentafluorophenyl)boron, triphenylboron, trimethylboron, tris(trimethylsilyl)borate and organoboroxine, and at least one neutral metallocene derived from a transition metal, said process of (co) polymerization comprising the steps of:

(1) mixing said neutral metallocene with a catalytic solid containing at least one element of group IVB of the Periodic Table, magnesium and a halogen;

(2) placing the mixture thus obtained in contact with at least one hydrocarbon diluent and the aluminum derivative; and (3) adding said ionizing agent to the product of step (2), wherein olefin is added simultaneously together with said hydrocarbon diluent and aluminum derivative in the second step or simultaneously with the ionizing agent in the third step.

2. The process according to claim 1, wherein the hydrocarbon diluent is chosen from aliphatic hydrocarbons.

3. The process according to claim 1, wherein the aluminium derivative and the neutral metallocene are used in quantities such that the molar ratio of the aluminium derivative to the neutral metallocene is at least 100.

4. The process according to claim 1, wherein the neutral metallocene and the catalytic solid are used in quantities such that the weight ratio of the neutral metallocene to the catalytic solid is at least 0.1 and not greater than 10.

5. The process according to claim 1, wherein the catalytic solid is mixed with an inorganic support, the neutral metallocene being subsequently added to this mixture.

6. The process according to claim 5, wherein the inorganic support is silica, alumina, magnesium chloride or a mixture of silica and magnesium chloride.

7. The process according to claim 1, wherein the olefin is ethylene and/or propylene.

8. The process according to claim 1, wherein the neutral metallocene corresponds to formula $(C_p)_a(C_{p'})_bMX_xZ_z$, in which:

each of $C_p$ and $C_{p'}$ denotes an unsaturated hydrocarbon radical coordinated to a central atom, it being possible for the groups $C_p$ and $C_{p'}$ to be bonded by a covalent bridge;

M denotes the transition metal chosen from groups IIIB, IVB, VB, and VIB of the Periodic Table;

a, b, x, and z denote integers such that $(a+b+x+z)=m$, $x \geq 0$, $z \geq 0$ and a and/or $b \neq 0$;

m denotes the valency of the transition metal M;

X denotes a halogen;

Z denotes a hydrocarbon radical which may optionally contain oxygen or a silyl radical of formula (—R,Si—R'R''R''') where R denotes an alkyl, alkenyl, aryl, alkoxy, or cycloalkyl group containing up to 20 carbon atoms;

R', R'', and R''' are identical or different and each denotes a halogen or an alkyl, alkenyl, aryl, alkoxy, or cycloalkyl group containing up to 20 carbon atoms; and t denotes 0 or 1.

9. The process according to claim 1, wherein the transition metal is zirconium.

10. The process according to claim 1, wherein the element of Group IVB of the catalytic solid is titanium and the halogen of the catalytic solid is chlorine.

11. The process according to claim 1, wherein the weight ratio of the transition metal to the element of Group IVB of the catalytic solid is from 0.05 to 10.

12. The process according to claim 1, wherein the catalytic solid has a content of element of Group IVB of the Periodic Table of 10 to 30% by weight, a halogen content of 20 to 50% by weight and a magnesium content of 0.5 to 20% by weight.

13. The process according to claim 1, wherein the catalyst system additionally includes an inorganic support.

14. The process according to claim 1, wherein the ionizing agent is chosen from the group consisting of tris (pentafluorophenyl)boron, triphenylboron, trimethylboron, tris(trimethylsilyl)borate, organoboroxines and triphenylcarbenium tetrakis(pentafluorophenyl)borate.

15. The process according to claim 1, wherein the neutral metallocene is halogenated.

16. The process according to claim 15, wherein the aluminium derivative is chosen from triethylaluminium and triisobutylaluminium.

17. The process according to claim 1, wherein the aluminium derivative is chosen from those in which the group T is a hydrocarbon radical chosen from optionally substituted alkyl, alkenyl, aryl, and alkoxy groups containing up to 20 carbon atoms.

18. The process according to claim 1, wherein the neutral metallocene or the ionizing agent is deposited on an inorganic support.

19. The process according to claim 1, wherein the neutral metallocene is selected from the compounds of formula $(C_p)_a(C_{p'})_bMX_xZ_z$ in which:

each of $C_p$ and $C_{p'}$ denotes an unsaturated hydrocarbon radical coordinated to a central atom, it being possible for the groups $C_p$ and $C_{p'}$ to be bonded by a covalent bridge;

M denotes the transition metal which is chosen from groups IIIB, IVB, VB, and VIB of the Periodic Table;

a, b, x, and z denote integers such that $(a+b+x+z)=m$, $x \geq 0$, $z > 0$ and a and/or $b \neq 0$;

m denotes the valency of the transition metal M;

X denotes a halogen; and

Z denotes a hydrocarbon radical prepared by reacting a compound of formula $(C_p)_a(C_{p'})_bMX_xH_z$ with an olefin.

20. The process according to claim 19, wherein the olefin is ethylene.

* * * * *